United States Patent
Nuzzi

(10) Patent No.: US 11,538,033 B2
(45) Date of Patent: *Dec. 27, 2022

(54) DISPUTE RESOLUTION CRYPTOCURRENCY SIDECHAIN SYSTEM

(71) Applicant: PayPal, Inc., San Jose, CA (US)

(72) Inventor: Frank Anthony Nuzzi, Pflugerville, TX (US)

(73) Assignee: PAYPAL, INC., San Jose, CA (US)

( * ) Notice: Subject to any disclaimer, the term of this patent is extended or adjusted under 35 U.S.C. 154(b) by 276 days.

This patent is subject to a terminal disclaimer.

(21) Appl. No.: 17/035,070

(22) Filed: Sep. 28, 2020

(65) Prior Publication Data
US 2021/0081936 A1  Mar. 18, 2021

Related U.S. Application Data

(63) Continuation of application No. 15/858,536, filed on Dec. 29, 2017, now Pat. No. 10,789,589.

(51) Int. Cl.
*G06Q 20/38* (2012.01)
*G06Q 20/06* (2012.01)
*G06Q 20/36* (2012.01)

(52) U.S. Cl.
CPC ......... *G06Q 20/389* (2013.01); *G06Q 20/065* (2013.01); *G06Q 20/0655* (2013.01);
(Continued)

(58) Field of Classification Search
CPC ............... G06Q 20/389; G06Q 20/065; G06Q 20/0665; G06Q 20/3829; G06Q 20/36; G06Q 2220/00
See application file for complete search history.

(56) References Cited

U.S. PATENT DOCUMENTS

2016/0330034 A1*  11/2016  Back ................... G06Q 20/065
2017/0046638 A1    2/2017  Chan et al.
(Continued)

FOREIGN PATENT DOCUMENTS

WO   WO 2017/027484 A1    2/2017
WO   WO 2017/170997 A1   10/2017

OTHER PUBLICATIONS

"What Is a Blockchain Sidechain All About?—NEWSBTC," 2017, 10 Pages, NEWSBTC, http://www.newsbtc.com/2015/06/11/what-is-a-blockchain-sidechain-all-about/ (Year: 2017).
(Continued)

*Primary Examiner* — Patrick McAtee
*Assistant Examiner* — Vincent I Idiake
(74) *Attorney, Agent, or Firm* — Haynes and Boone, LLP

(57) ABSTRACT

A dispute resolution cryptocurrency sidechain system includes a system provider that determines that a transaction amount for a transaction has been received at a first public ledger address on a public ledger from a second public ledger address and, in response, allocates a sidechain address on a dispute resolution sidechain ledger. The system provider then sends, through a network to a payer and a payee involved in the transaction, the sidechain address, and monitors the sidechain address for dispute communications. Based on detecting a first dispute communication that is received at the sidechain address and that is signed using a private key that identifies the payer, the system provider device causes a portion of the transaction amount that was received at the first public ledger address to be sent to the second public ledger address.

20 Claims, 9 Drawing Sheets

(52) U.S. Cl.
CPC ......... *G06Q 20/3829* (2013.01); *G06Q 20/36* (2013.01); *G06Q 2220/00* (2013.01)

(56) References Cited

U.S. PATENT DOCUMENTS

2017/0046693 A1* 2/2017 Haldenby .............. G06F 21/62
2017/0300912 A1* 10/2017 Narasimhan ........... G06Q 20/02

OTHER PUBLICATIONS

What Is a Blockchain Sidechain All About?—NEWSBTC, 2017, 10 Pages, NEWSBTC, http://www.newsbtc.com/2015/06/11/what-is-a-blockchain-sidechain-all-about/.

Back et al., "Enabling Blockchain Innovation with Pegged Sidechains," 2014, 18 Pages [531-552], Commit 5620e43.

Back A., et al., "Enabling Blockchain Innovations with Pegged Sidechains," XP055392256, retrieved from the internet: http://kevinriggen.com/files/sidechains.pdf, Oct. 22, 2014, 25 pages.

Extended European Search Report for European Application No. 18896342.5, dated Aug. 12, 2021, 10 pages.

Friedenbach M., et al., "Freimarkets: Extending Bitcoin Protocol With User-Specified Bearer Instruments, Peer-To-Peer Exchange, Off-Chain Accounting, Auctions, Derivatives and Transitive Transactions," XP055828069, retrieved from the internet: http://freico.in/docs/freimarkets.pdf, Version v0.0.1, Aug. 24, 2013, 25 pages.

International Appl. No. PCT/US2018/067842, International Search Report and Written Opinion dated Mar. 21, 2019, 6 pages.

* cited by examiner

US 11,538,033 B2

DISPUTE RESOLUTION CRYPTOCURRENCY SIDECHAIN SYSTEM

CROSS-REFERENCE TO RELATED APPLICATION

This application is a continuation of U.S. patent application Ser. No. 15/858,536, filed Dec. 29, 2017, issuing as U.S. Pat. No. 10,789,589, the disclosure of which is herein incorporated by reference in its entirety.

BACKGROUND

The present disclosure generally relates to online and/or mobile payments, and more particularly to the use of a cryptocurrency sidechain system for dispute resolution with a cryptocurrency transaction.

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Conventional payment service providers typically provide for payment by a payer to a payee through the use of payer accounts of the payer (e.g., credit accounts, banking account, and/or a variety of other payer accounts that may be provided by an account provider). For example, the payment service provider may provide a payment service account to the payer, and the payer may link one or more payer accounts to the payment service account (or the payment service account may include a payer account provided by the payment service provider). In a transaction between the payer and the payee, the payment service provider may then transfer funds from one of the payer accounts to a payee account of the payee (which may also be provided by the account providers or payment service provider). The use of such payer accounts, payee accounts, and payment service accounts is controlled by one or more account providers that operate to ensure that funds in the payer accounts or payee accounts are not misappropriated, and to mediate disputes associated with the transfer of funds between payer accounts and payee accounts.

An alternative to payer accounts and payee accounts provided by an account provider is the use of distributed crypto currencies such as, for example, Bitcoin, Ethereum, Litecoin, Monero, and/or a variety of other distributed crypto currencies known in the art. Distributed crypto currencies are not controlled by any central authority, but rather by a distributed network of computing devices that operate to confirm transfers of the cryptocurrency between payers and payees. Such decentralized distributed crypto currencies provide for the non-reversible transfer of the cryptocurrency between users in the system, as there is no central authority that ensures that funds of the users are not misappropriated or that mediates disputes associated with the transfer of the cryptocurrency between users. In other words, once a transfer has been made from a payer to a payee, there is no way to reverse that transfer unless the payee decides to transfer the cryptocurrency back to the payer in a new transaction. This feature of distributed crypto currencies provides a number of benefits (e.g., reduced transaction costs), but prevents a payers and payees from disputing a transaction in the event one of the parties does not satisfy their end of the transaction.

Thus, there is a need for an improved cryptocurrency system that allows for disputes between parties involved in a transaction.

Figure 1:
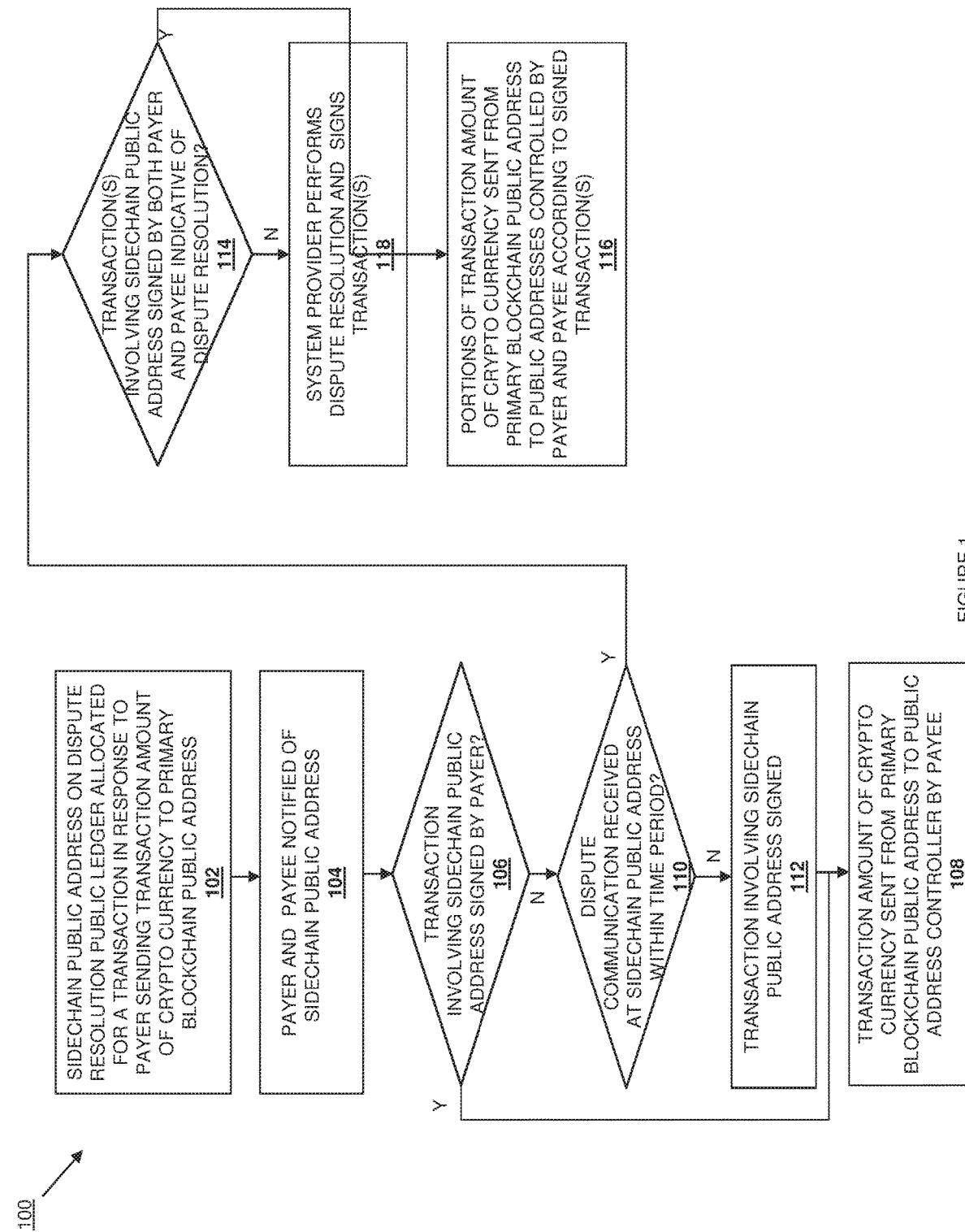
FIG. 1 is a flow chart illustrating an embodiment of a method for providing a dispute resolution cryptocurrency side chain system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure describe systems and methods for providing a dispute resolution cryptocurrency side chain system that utilizes a sidechain (e.g., a secondary dispute resolution blockchain or channel) for performing dispute resolution for transactions occurring on a primary blockchain (e.g., a blockchain upon which valid cryptocurrency exchange transactions are recorded). For example, as discussed in further detail below, payers that perform transactions with payees using a cryptocurrency and that also desire access to a dispute resolution process in the event those transactions are not satisfactory may send the transaction amount of the cryptocurrency to a designated primary blockchain public address that causes the transaction amount of the cryptocurrency to be "locked" (e.g., not transferrable for some period of time), and that results in the allocation of a sidechain/channel public address on the sidechain/channel for the transaction. The payee may then attempt to satisfy their end of the transaction, and the sidechain/channel public address may be utilized for dispute resolution in the event the payer is not satisfied with the transaction. In the event the payer is satisfied with the transaction, the payer may sign a transaction involving the sidechain/channel public address with their private key, which causes the transaction amount of the cryptocurrency sent from the designated primary blockchain public address to a primary blockchain public address controlled by the payee, completing the transaction.

However, in the event of a dispute with the transaction, the payer and the payee may sign transactions (with their private keys) that involve the sidechain/channel public address and that include dispute communications (e.g., proof of delivery, proof of a damaged product, etc.) in metadata included in the transaction, and in some situations a system provider may review those dispute communications to determine a dispute resolution. For example, the dispute resolution may involve the system provider signing transaction(s) (with their private key) that involve the sidechain/channel public address to cause a first portion of the transaction amount of the cryptocurrency to be sent from the designated primary blockchain public address to a primary blockchain public address controlled by the payee, and cause a second portion of the transaction amount of the cryptocurrency to be sent from the designated primary blockchain public address to a primary blockchain address controlled by the payer (e.g., when the system provider provides some level of refund to the payer). In another example, the payer and the payee may sign transactions (with their private keys) that involve the sidechain/channel public address to cause portions of the transaction amount of the cryptocurrency to be sent from the designated primary blockchain public address to each of a primary blockchain public address controlled by the payee and a primary blockchain address controlled by the payer (e.g., when the payer and payee agree that the payee will provide some level of refund to the payer).

Figure 2:
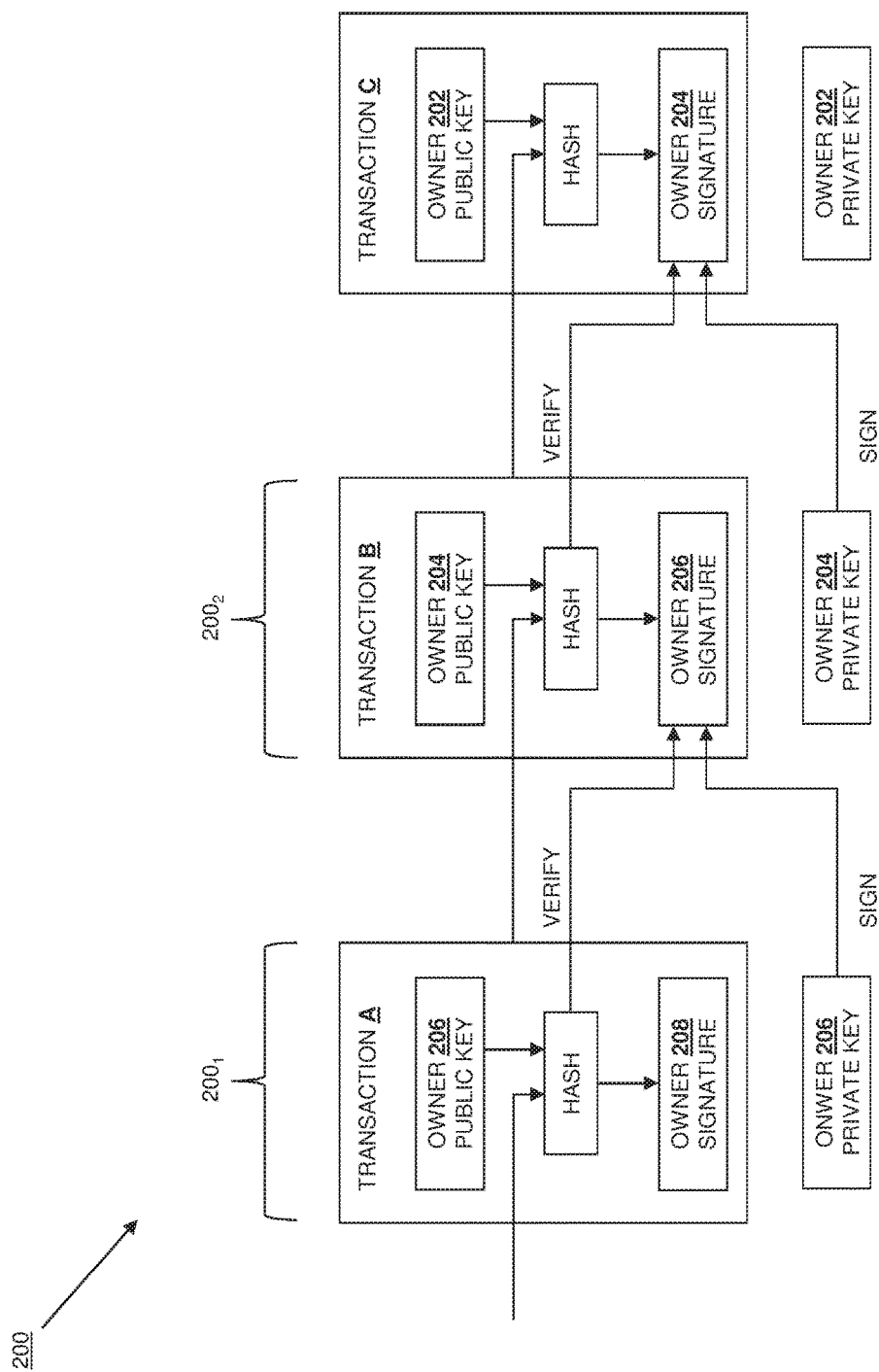
FIG. 2 is a schematic view illustrating an embodiment of an electronic coin.
Figure 3:
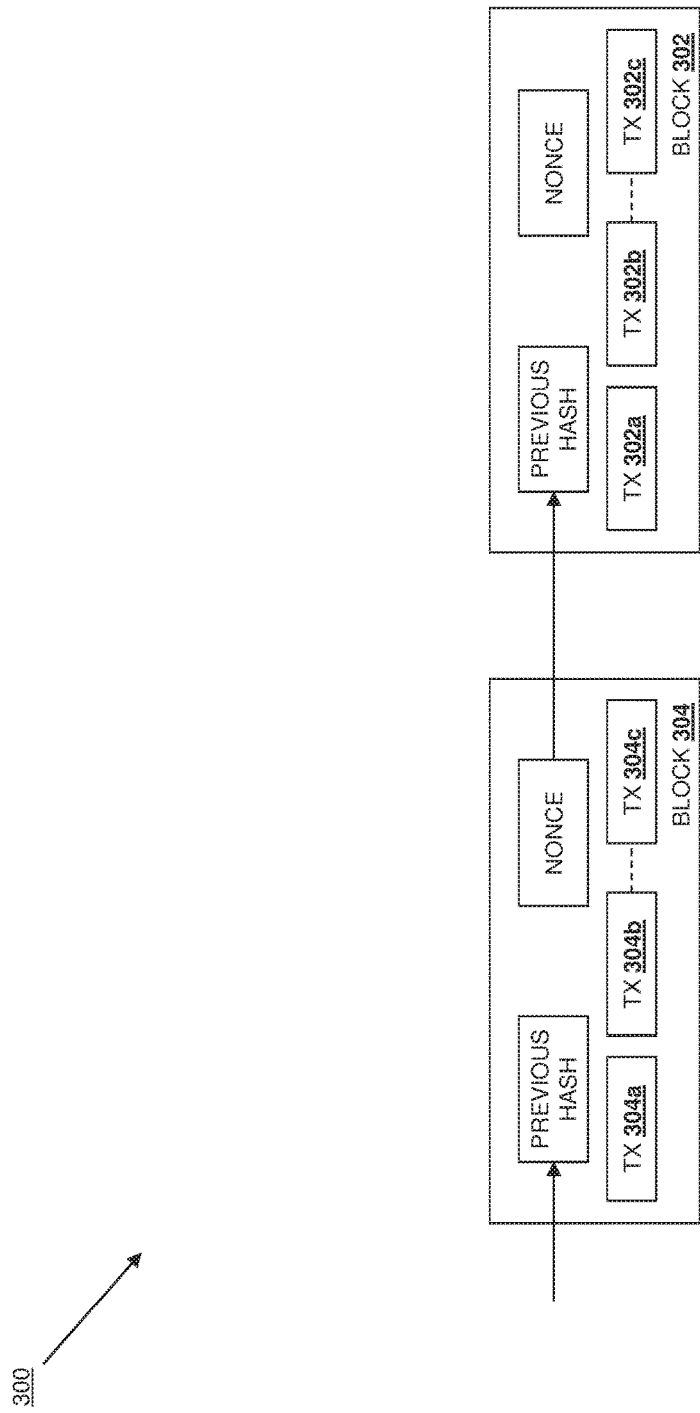
FIG. 3 is a schematic view illustrating an embodiment of a cryptocurrency public ledger.

Referring now to FIGS. 1, 2, and 3, a method 100 for providing dispute resolution via a cryptocurrency side chain is illustrated. In some embodiments of the method 100 described below, one or more system provider devices may operate to perform at least a portion the method 100. For example, one or more distributed groups of devices may operate to create (a.k.a. "mine") a cryptocurrency on a primary blockchain, maintain a secondary dispute resolution sidechain/channel, and perform the method 100 as detailed below. In another embodiment, one or more system provider devices may perform the method 100 separately from the creation of the cryptocurrency on the primary blockchain. For example, a payment service provider such as, for example, PayPal, Inc. of San Jose, Calif., may utilize payment service provider device(s) to perform at least some of the method 100 discussed below, and in some embodiments may operate in cooperation with one or more other system providers (via their system provider devices), payers (via their payer devices) and/or payees (via their payee devices) to perform at least the dispute resolution portions of the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Referring now to FIG. 2, an embodiment of an electronic coin 200 is illustrated and described briefly for reference to the method 100 discussed below. The cryptocurrency system associated with the present disclosure defines an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of the previous owners 204, 206, and 208. Specifically, in transaction A, a hash of the public key of owner 206 (i.e., the owner receiving, as a result of transaction A, an electronic coin 2001 defined by digital signatures provided up to transaction A) and the previous transaction (not illustrated, but occurring prior to transaction A) was signed by owner 208 (i.e., the owner providing, as a result of transaction A, the electronic coin 2001 defined by digital signatures provided up to transaction A) and added to an initial electronic coin (which was defined by digital signatures provided up to the transaction prior to transaction A) such that the electronic coin 2001 was transferred to owner 206. Similarly, in transaction B, a hash of the public key of owner 204 (i.e., the owner receiving, as a result of transaction B, an electronic coin 2002 defined by digital signatures provided up to transaction B) and transaction A was signed by owner 206 and added to the electronic coin 2001 such that the electronic coin 2002 was transferred to owner 204. Similarly, in transaction C, a hash of the public key of owner 202 (i.e., the owner receiving, as a result of transaction C, the electronic coin 200 defined by digital signatures provided up to transaction C) and the transaction B was signed by owner 204 and added to the electronic coin 2002 such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coins" is used to encompass any amount of electronic coins, from fractions of a coin (e.g., 0.00564500 electronic coins) to many multiples of coins (e.g., 56,000.00000000 electronic coins).

Referring now to FIG. 3, an embodiment of a cryptocurrency public ledger 300 is illustrated and described briefly for reference to the method 100 discussed below. The cryptocurrency public ledger 300 operates to verify that payers transferring an electronic coin (e.g., referring back to FIG. 2, owner 206 in transaction A, owner 204 in transaction B, and owner 202 in transaction C) did not "double-spend" (e.g., sign any previous transactions involving) that electronic coin. To produce the cryptocurrency public ledger 300, a distributed network of devices operates to agree on a single history of transactions in the order in which they were received such that it may be determined that a transaction between a payer and a payee using an electronic coin is the first transaction associated with that electronic coin. Each device in the distributed network operates to collect new transactions into a block, and then to increment a proof-of work system that includes determining a value that when hashed with the block provides a required number of zero bits. For example, for a block 302 that includes a plurality of transactions 302a, 302b, and up to 302c, a device in the distributed network may increment a nonce in the block 302 until a value is found that gives a hash of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash of the accepted block 302). The distributed network will always consider the longest chain blocks to be the correct one, and will operate to continue to extend it. If a device receives two different versions of a block, it will work on the first block received, but save the second block received in case the branch of the chain that includes the second block becomes longer (at which point that device with switch to working on the branch of the chain that includes the second block).

In the manner described above, a distributed cryptocurrency system is provided in which payers and payees may participate in transactions with each other using the electronic coins discussed above and without the need for a centralized authority such as a bank. Each of those transactions is recorded in the cryptocurrency public ledger to ensure that the electronic coins may only be spent by a payer once. However, as described above, the transactions in such distributed cryptocurrency systems are not subject to disputes between the payer and the payee, as once a transaction is included in a block that is accepted in the cryptocurrency public ledger 300, the transaction amount of cryptocurrency in that transaction is controlled by the payee. The method 100 contemplates improvements on such distributed cryptocurrency systems by providing a sidechain or channel (e.g., dispute resolution sidechain public ledger or payment channel) that causes transaction amounts of cryptocurrency used in transactions on the cryptocurrency public ledger 300 to be held until a time period passes in which a dispute resolution process may be performed via the sidechain/channel.

As discussed below, a dispute resolution sidechain may be provided as a dispute resolution public ledger that is provided similarly to the cryptocurrency public ledger 300 discussed above. For example, the dispute resolution sidechain may include sidechain public addresses that may be allocated in response to cryptocurrency transactions occurring on the cryptocurrency public ledger 300 that utilize the dispute resolution system of the present application, with tokens that are similar to the electronic coins 200 discussed above associated with those allocated sidechain public addresses and configured to be transferred/tracked via the dispute resolution sidechain in a manner that is substantially similar to that discussed above for the electronic coin 200. As such, a distributed network of computers (e.g., operated by user devices, controlled by the system provider, etc.) may maintain the dispute resolution sidechain, and build a dispute resolution sidechain public ledger that is similar to the cryptocurrency public ledger 300 discussed above.

Figure 4:
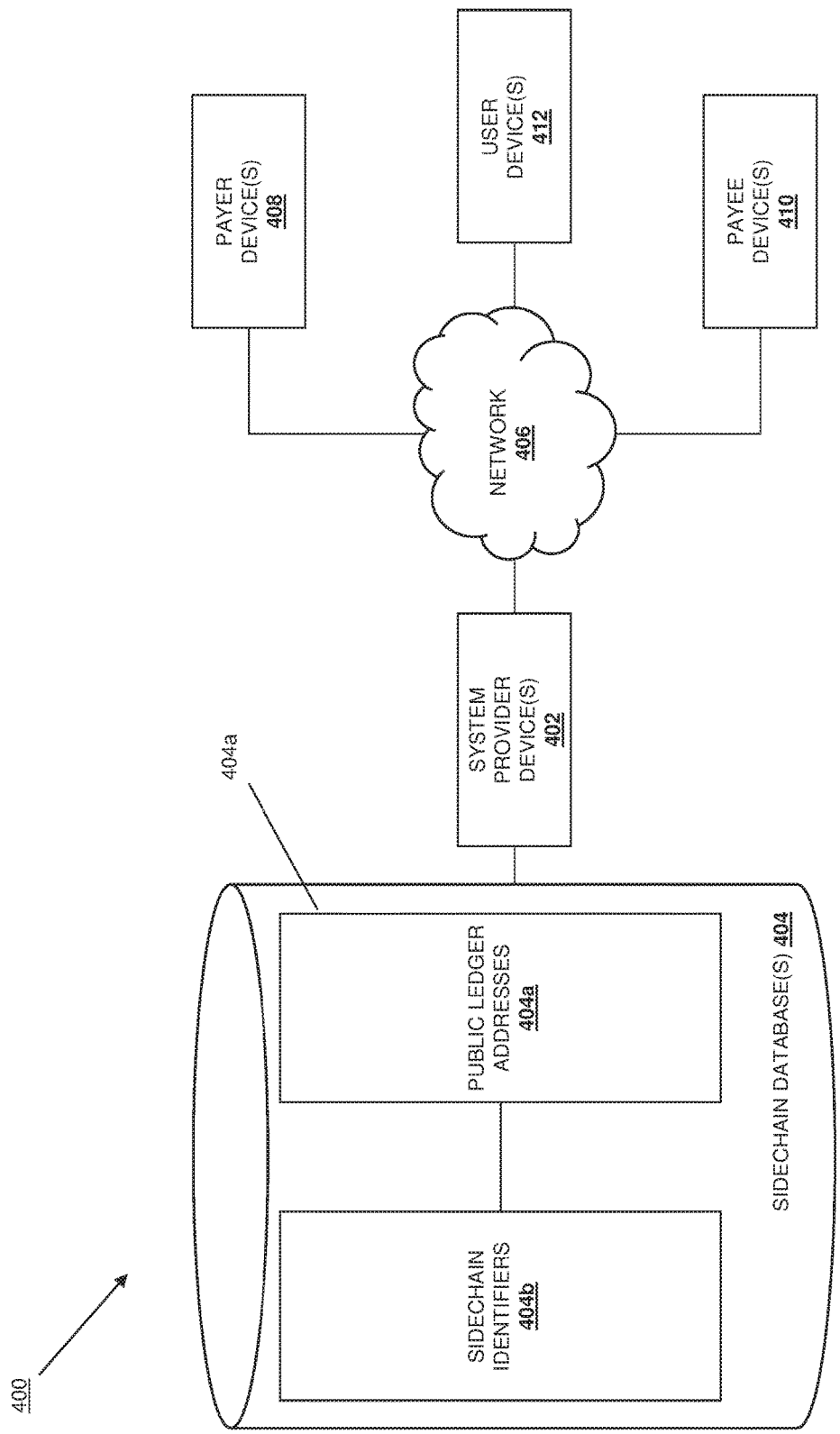
FIG. 4 is a schematic view illustrating an embodiment of a dispute resolution cryptocurrency side chain system.

Referring now to FIG. 4, in some embodiments, a dispute resolution sidechain may be provided as a privately maintained ledger that is maintained by the system provider, with system provider device(s) operating to maintain the sidechain and build a dispute resolution sidechain private ledger that is similar to the cryptocurrency public ledger 300 discussed above (but maintained by a centralized entity). As such, system provider device(s) 402 are coupled to sidechain database(s) 404 that may associate public ledger addresses 404*a* (e.g., the primary cryptocurrency blockchain public addresses discussed above) with sidechain identifiers 404*b* (e.g., the secondary dispute resolution sidechain public addresses discussed above). Furthermore, the system provider device(s) 402 may be coupled through a network 406 (e.g., the Internet) to payer device(s) 408, payee device(s) 410, and other user device(s) 412.

In some embodiments, a dispute resolution channel may be provided by the system provider device by allocating channel public addresses that are associated with smart contracts and that are utilized in a manner similar to public addresses provided in payment channels such as, for example, payment channels utilized in the Lightning Network, described in "The Bitcoin Lightning Network: Scalable Off-Chain Instant Payments" paper, authored by Joseph Poon and Thaddeus Dryja. As such, the smart contracts associated with the channel public addresses may provide for the tracking and management of the dispute resolution processes discussed below while remaining within the scope of the present disclosure. While the dispute resolution sidechain public ledger and the channel public addresses utilizing smart contracts are described separately below, one of skill in the art in possession of the present disclosure will recognize that public ledgers and smart contracts may be combined or integrated, and such combinations are envisioned as falling within the scope of the present disclosure as well. Furthermore, one of skill in the art in possession of the present disclosure will recognize that the dispute resolution side chain/channel may be provided in a variety of manners that will fall within the scope of the present disclosure.

Figure 5:
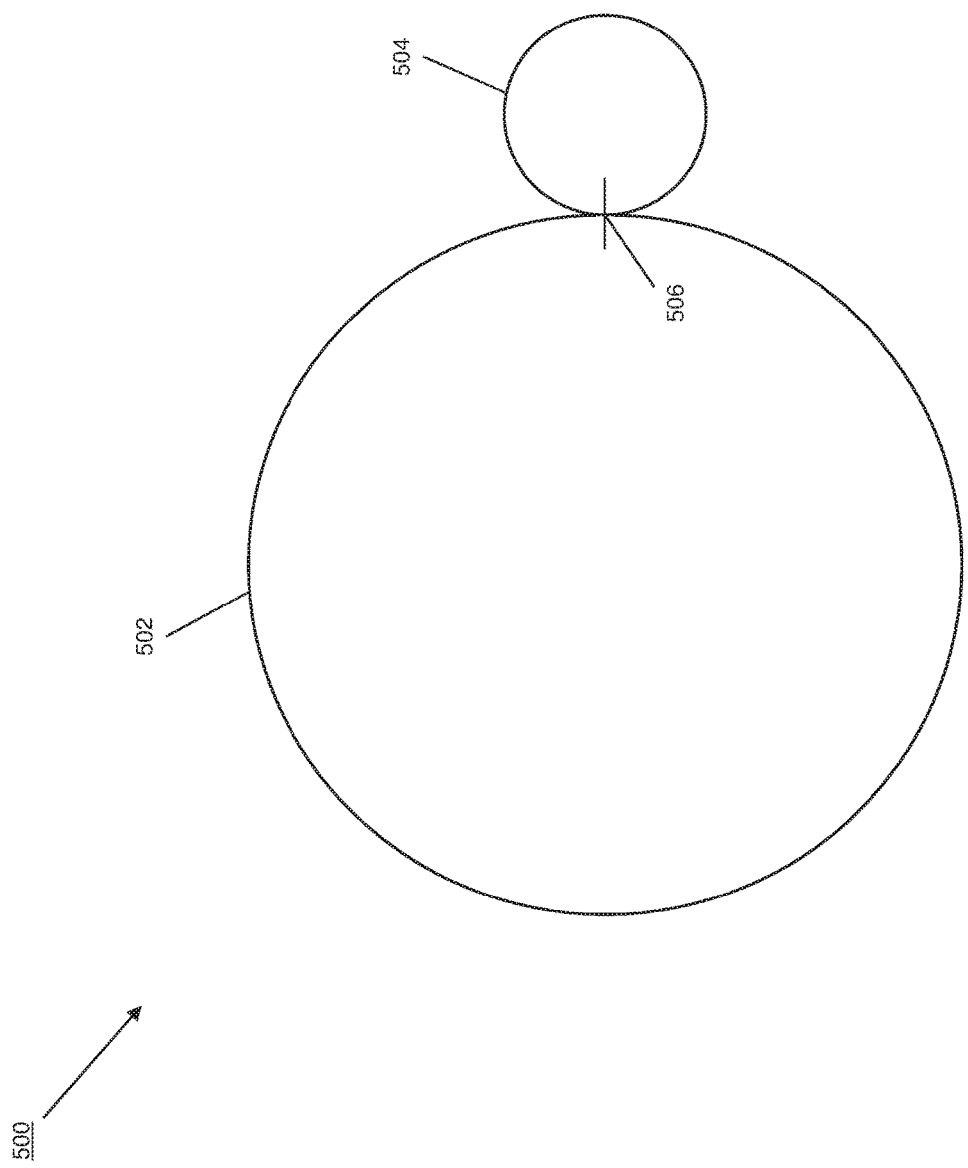
FIG. 5 is a schematic view illustrating an embodiment of a side chain linked to a public ledger.

For reference to the discussion below, FIG. 5 illustrates a schematic view of the dispute resolution cryptocurrency sidechain system 500 including a representation of a primary cryptocurrency transaction blockchain 502, a secondary dispute resolution sidechain 504, and the "pegging" or association 506 of the secondary dispute resolution sidechain 504 (e.g., a public address in the dispute resolution sidechain/channel) to the primary cryptocurrency transaction blockchain 502 (e.g., a public address on the cyptocurrency transaction blockchain) via a transaction occurring on the primary cryptocurrency transaction blockchain 502 that causes an sidechain public address to be allocated on the secondary dispute resolution sidechain 504.

The method 100 begins at block 102 where a sidechain public address on a dispute resolution public ledger is allocated for a primary cryptocurrency transaction in response to a payer sending a transaction amount of a cryptocurrency to a primary cryptocurrency blockchain public address. In an embodiment, at or before block 102, a payer and payee may begin a transaction (e.g., for goods and/or services) that requires the payer to transfer funds to a payee. In a specific example, a system provider such as, for example, PayPal Inc. of San Jose, Calif., United States may provide a wallet application that is utilized on a payer device of the payer, and the payer may select an option provided on the wallet application to pay with a cryptocurrency (i.e., if such a payment option is supported by the payee). In addition to providing the option to pay with the cryptocurrency, the wallet application on the payer device may also allow the payer to select to have the transaction subject to dispute resolution. As such, in some embodiments, the dispute resolution process described below may be an opt-in process provided by the system provider (i.e., the payer creating the cryptocurrency transaction via the wallet application is required to request to have the cryptocurrency transaction subject to the dispute resolution process). However, in other embodiments, the dispute resolution process described below may be a default process that is part of the use of the cryptocurrency, and thus payers and/or payees may be required to opt out of the dispute resolution process if they do not wish to participate in it (i.e., cryptocurrency transactions created via the wallet application may automatically be subject to the dispute resolution process without a request to forego the dispute resolution process). Furthermore, in some embodiments, the dispute resolution process may be made mandatory for all cryptocurrency transactions conducted using the wallet application.

As would be understood by one of skill in the art in possession of the present disclosure, in a conventional crypto-currency transaction system a payer would typically create a transaction that includes a cryptocurrency blockchain public address that is controlled by the payee along with a transaction amount. The payee would then broadcast that transaction to have computing devices that maintain the cryptocurrency blockchain include that transaction in a block that is then added to the cryptocurrency blockchain such that the transaction amount is transferred to the payee (via the transfer from the payers cryptocurrency blockchain public address to the payees cryptocurrency blockchain public address). However, with reference to FIG. 5, in the dispute resolution cryptocurrency sidechain system of the present disclosure, the opting-in to dispute resolution (or the default use of dispute resolution) creates the transaction 506 (which is sent from the cryptocurrency blockchain public address that is controlled by the payer, and that identifies the cryptocurrency blockchain public address that is controlled by the payee along with a transaction amount, similarly as described in the conventional cryptocurrency blockchain system above) that is then sent to a cryptocurrency blockchain public address in the primary cryptocurrency transaction blockchain 502 that is linked to the dispute resolution sidechain/channel 504.

For example, a transaction created conventionally as discussed above but that also includes the request to participate in the dispute resolution process may have the cryptocurrency blockchain public address that is controlled by the payee (which would be designated as a "receiving" public address in such conventional cryptocurrency transactions) replaced by the cryptocurrency blockchain public address that is linked to the dispute resolution sidechain/channel 504 (i.e., in response to the payer selecting to use dispute resolution with the transaction, or the transaction defaulting to dispute resolution), with the cryptocurrency blockchain public address that is controlled by the payee provided as metadata in that modified cryptocurrency transaction. As such, when that transaction is broadcast by the payer, the computing devices that maintain the primary cryptocurrency transaction blockchain 502 add that transaction to a block such that the transaction amount is transferred to the cryptocurrency blockchain public address that is linked to the dispute resolution sidechain 504 (via the transfer from the payers cryptocurrency blockchain public address). In response to the receipt of the transaction amount at the cryptocurrency blockchain public address that is linked to the dispute resolution sidechain 504, a sidechain public address on the dispute resolution sidechain 504 may be allocated for the transaction. In other words, the dispute resolution sidechain 504 may be "pegged" to the primary cryptocurrency transaction blockchain 502 via one or more cryptocurrency blockchain public addresses that cause, in response to receiving a transaction (e.g., the transaction 506), the allocation of a corresponding sidechain public address on the dispute resolution sidechain 504.

In a specific embodiment, the cryptocurrency blockchain public address on the primary cryptocurrency transaction blockchain 502 may be associated with a smart contract that is linked to sidechain/channel public address on the dispute resolution sidechain/channel 504. As discussed below, the transaction amount of the cryptocurrency that is transferred to the cryptocurrency blockchain public address at block 102 may be subsequently dealt with (i.e., transferred to the payee and/or payer) based on actions associated with the sidechain/channel public address, and the rules for dealing with that transaction amount of cryptocurrency may be defined by a smart contract that provides for the monitoring of the sidechain/channel public address. While some examples of the functionality provided by a smart contract are detailed below, one of skill in the art in possession of the present disclosure will recognize how a smart contract may be applied in the method 100 to provide for any of the functionality described herein.

While the allocation of the sidechain/channel public address has been described as being performed in response to the receiving of a transaction at a particular cryptocurrency blockchain public address, in some embodiments, the cryptocurrency blockchain public address-sidechain/channel public address link may be created prior to the payer generating the transaction while remaining within the scope of the present disclosure as well. Furthermore, as discussed below, in some embodiments, the sidechain/channel public address may be associated with sidechain/channel tokens that are transferrable similarly to the electronic coins discussed above. However, in other embodiments, the sidechain/channel public address may be utilized for the dispute communications below (e.g., via the signing of zero-token-transactions) without the need for token(s) to be allocated to that sidechain/channel public address. While a few alternatives are described, one of skill in the art in possession of the present disclosure will recognize that the dispute resolution sidechain/channel and its sidechain/channel public addresses may function in a variety of manners that will fall within the scope of the present disclosure.

The method 100 then proceeds to block 104 where the payer and the payee are notified of the sidechain/channel public address. In an embodiment, at block 104, a notification that identifies the sidechain/channel public address allocated at block 102 may be sent to each of a payer device of the payer and a payee device of the payee. In one example, at block 104, the allocation of the sidechain/channel public address for the cryptocurrency transaction may cause the creation and broadcast of zero amount or low amount secondary transactions (e.g., 0.00000001 Bitcoin transactions) to each of the cryptocurrency blockchain public addresses that are included in the primary cryptocurrency transaction and controlled by the payer and payee, respectively, with those secondary transactions identifying the sidechain public address allocated on the dispute resolution sidechain 504 at block 102. In another example, each of the payer and the payee may have previously registered the cryptocurrency blockchain public addresses that are included in the primary cryptocurrency transaction with the system provider, and system provider device may use those cryptocurrency blockchain public addresses in the primary transaction to identify the payer and the payee and access communication information for the payer and payee (e.g., email addresses, phone numbers, payment application identifiers associated with the wallet application provided by the system provider, etc.), and use that communication information at block 104 to notify the payer and the payee of the sidechain/channel public address that has been allocated (e.g., via email, text message, popups, or other communications on their respective devices). While a few examples have been provided, one of skill in the art in possession of the present disclosure will appreciate that the payer and the payee may be notified of the sidechain/channel public address in a variety of manners that will fall within the scope of the present disclosure as well.

In an embodiment, the notification of the sidechain/channel public address that is provided to the payer and the payee may include the transfer or identification of private key(s) that may be used to sign transactions involving the sidechain/channel public address. For example, a sidechain private key that is configured to sign valid transactions may be provided to each of the payer device of the payer and the payee device of the payee at block 104. In some specific examples discussed below, the sidechain/channel public address may be multi-signature address that requires the signatures from more than one private key in order to be valid, and one of skill in the art in possession of the present disclosure will recognize how private keys may be provided to the payer, the payee, and the system provider in order to provide the functionality discussed below.

The method 100 then proceeds to decision block 106 where it is determined whether a transaction involving the sidechain/channel public address has been signed by the payer. In an embodiment, at block 106, the payer may use their private key to sign a transaction involving the sidechain/channel public address if the transaction with the payee has been satisfied by the payee. For example, following the payer sending of the transaction amount of the cryptocurrency at block 102, the payee may perform their end of the transaction (e.g., delivering a product or providing a service that was purchased in the transaction to the payer). In the event the payer is satisfied with the product received, the payer may then utilize the wallet application on their payer device to access a private key associated with the sidechain/channel public address and sign a transaction involving the sidechain/channel public address. As discussed below, the signing of the transaction involving the sidechain/channel public address at decision block 106 is used to indicate that the payer is satisfied with the primary transaction with the payee and that no dispute is being performed for that transaction. As such, in some examples, the signing of the transaction involving the sidechain/channel public address may include metadata that provides the indication that the payer is satisfied with the primary cryptocurrency transaction with the payee. In other examples, the sidechain/channel public address may be associated with tokens, and the transaction involving the sidechain/channel public address that is signed at decision block 106 may include an instruction to transfer all of those tokens (e.g., to a sidechain/channel public address that may be have allocated to the payee, and/or that has otherwise been designated to provide such a transfer), which may be indicative of the payer being satisfied with the transaction and not wishing to dispute that transaction. While a few examples have been provided, one of skill in the art in possession of the present disclosure will recognize that a signed transaction involving the sidechain/channel public address may include a variety of features for providing the functionality discussed below.

If, at decision block 106, it is determined that a transaction involving the sidechain/channel public address has been signed by the payer, the method 100 proceeds to block 108 where the transaction amount of the cryptocurrency is sent from the cryptocurrency blockchain public address that received it at block 102 to a cryptocurrency public address controlled by the payee. In an embodiment, at block 106 and in response to the determining that the payer signed a transaction that involves the sidechain/channel public address and that indicates that the payer is satisfied with the primary cryptocurrency transaction with the payee, a transaction may be signed with a private key associated with the cryptocurrency blockchain public address that received the transaction amount at block 102, and that transaction may then be broadcast to cause the transaction amount of the cryptocurrency to be transferred to a cryptocurrency public address controlled by the payee (e.g., the cryptocurrency blockchain public address that was included in the transaction sent by the payer at block 102).

In one example, the cryptocurrency blockchain public address that received the transaction amount at block 102 may be associated with a smart contract as discussed above, and the terms of that smart contract may, in response to the detecting the signed transaction that involves the sidechain/channel public address and that indicates that that the payer is satisfied with the primary transaction with the payee, cause a cryptocurrency transaction that identifies the cryptocurrency blockchain public address that received the transaction amount at block 102 to be automatically signed as discussed above so that that transaction amount is transferred to the payee. In another example, the system provider device may, in response to the detecting the signed transaction that involves the sidechain/channel public address and that indicates that that the payer is satisfied with the primary transaction with the payee, use a private key to sign a cryptocurrency transaction that identifies the cryptocurrency blockchain public address that received the transaction amount at block 102 to cause the transaction amount to be transferred to the payee. While a few examples have been provided, one of skill in the art in possession of the present disclosure will recognize that the transaction amount of cryptocurrency may be transferred to the payee at block 108 in a variety of manners that will fall within the scope of the present disclosure. As such, at block 108, the payee receives the entire transaction amount of cryptocurrency from the payer when the payer is satisfied with the transaction and does not wish to initiate a dispute.

If, at decision block 106, it is determined that a transaction involving the sidechain/channel public address has not been signed by the payer, the method 100 proceeds to decision block 110 where it is determined whether dispute communication(s) have been received at the sidechain/channel public address within a time period. In an embodiment, at block 110, either or both of the payer and the payee may create transactions involving the sidechain/channel public address, include dispute communications that may be provided as, for example, metadata in the transaction, sign that transaction with their private key, and broadcast that transaction to have the dispute communication associated with the sidechain/channel public address. For example, the payer may not receive the product or service that part of the transaction with the payee, may receive a substandard product or service that was part of the transaction with the payee, or may otherwise be unsatisfied with the transaction. In response, the payer may use their payer device to create a transaction that involves the sidechain/channel public address, may add metadata or other information that provide dispute communications that include evidence of the unsatisfactory transaction, and may sign that transaction with a private key associated with the sidechain/channel public address and broadcast it. Similarly, the payee may use their payee device to create a transaction that involves the sidechain/chcannel public address, may add metadata or other information that provide dispute communications that include evidence of issues with the payer satisfying the transaction (e.g., not allowing the payer to perform a service that was transacted), and may sign that transaction with a private key associated with the sidechain/channel public address and broadcast it.

If, at decision block 110, it is determined that a dispute communication has not been received at the sidechain/channel public address within the time period, the method 100 proceeds to block 112 where a transaction involving the sidechain/channel public address is signed. In an embodiment, at decision block 110 a time period may pass that is indicative that the transaction has been satisfied and neither party intends to dispute it, and that causes a transaction involving the sidechain/channel public address to be signed. For example, as discussed above, the sidechain/channel public address (and/or the cryptocurrency public address that received the transaction at block 102) may be associated with a smart contract, and that smart contract may designate a time period after which, if no dispute communications are received at the sidechain/channel public address, the sidechain/channel public address (or cryptocurrency blockchain public address) is automatically signed with a private key to cause the method 100 to proceed to block 108 where the transaction amount of the crypto currency is sent from the primary cryptocurrency public address that received it at block 102 to a public cryptocurrency address controlled by the payee in substantially the same manner as discussed above.

In a specific example, the sidechain/channel public address and/or smart contract may be created at block 102 with a lock time that corresponds with the time period and that is authorized to expire only if the no dispute communications have been received in transactions signed by the payer or payee at the sidechain/channel public address. As such, the determination that a dispute communication has not been received at the sidechain/channel public address within the time period may be performed automatically according to the smart contract. However, in another example, the system provider may monitor the sidechain/channel public address to determine that the time period has expired at decision block 110 and sign the transaction involving the sidechain/channel public address at block 112 (e.g., using a private key associated with that sidechain/channel public address) while remaining within the scope of the present disclosure as well, which causes the method 100 to proceed to block 108 where the transaction amount of the cryptocurrency is sent from the primary cryptocurrency public address to a cryptocurrency public address controlled by the payee in substantially the same manner as discussed above. In some embodiments, the payer and/or the payee may extend the time period (without creating dispute communications) by creating a transaction that involves the sidechain/channel public address and that indicates the time period needs to be extended (e.g., when a delivery has been delayed), which may be enabled by the smart contract discussed below, and that may require signed transactions from both of the payer and the payee.

The time period that must expire at decision block 110 for the method 100 to proceed to block 112 may be selected based on the transaction, may be designated by the payer and/or payee, and/or may be chosen based on a variety of techniques that would be apparent to one of skill in the art in possession of the present disclosure. For example, for a product being delivered, the time period that must expire at decision block 110 may be selected based on an estimated delivery time. Similarly, for a service being provided by the payee, the time period that must expire at decision block 110 may be some time period following the provisioning of the service. In some embodiments, the payer and payee may negotiate the time period that must expire at decision block 110 as part of, for example, the selection by the payer or the payee to use the dispute resolution system with the cryptocurrency transaction. While a few examples have been provided, one of skill in the art in possession off the present disclosure will recognize that the time period that must expire at decision block 110 to have the transaction involving the sidechain/channel public address be automatically signed or signed by the system provider may be selected based on a variety of criteria that will fall within the scope of the present disclosure.

If, at decision block 110, it is determined that a dispute communication has been received at the sidechain public address within the time period, the method 100 proceeds to decision block 114 where it is determined whether transaction(s) involving the sidechain/channel public address have been signed by both the payer and the payee and are indicative of a dispute resolution. In an embodiment, at or before decision block 114, signed transactions that include dispute communications may be verified (e.g., via the private key used to sign those transactions) and added to the secondary dispute resolution sidechain public ledger, which allows them to be reviewed (in particular by the payer, the payee, and/or the system provider). Furthermore, upon reviewing a dispute communication, the payer and/or the payee may create another transaction that is directed to the sidechain/channel public address, that includes metadata or other information that provides additional dispute communications that include additional evidence to be considered about the unsatisfactory transaction, and those transactions may be signed with a private key associated with the sidechain/channel public address. As such, the secondary dispute resolution sidechain/channel allows the payer and the payee to submit evidence of an unsatisfactory transaction, and rebuttal evidence to dispute any previously submitted evidence. To provide a specific example, a payer may provide a transaction involving the sidechain/channel public address that includes dispute communications that claims that a product that was part of a transaction was never received. In response, the payee may provide a transaction involving the sidechain/channel public address that includes dispute communications having postal service documentation that proves delivery to the payer's home. One of skill in the art in possession of the present disclosure will appreciate that any number of transactions may be created involving the sidechain/channel public address in order to provide any amount of the dispute communications discussed above.

As discussed above, in some embodiments, the sidechain/channel public address may be associated with tokens, and those tokens may be utilized as a negotiating instrument as part of the dispute communications. For example, the tokens associated with the sidechain/channel public address may relate (e.g., may be issued one-to-one with) the transaction amount of the cryptocurrency, and dispute communications may propose a transfer of the tokens to indicate a requested refund (e.g., on the payers side) or proposed refund (e.g., on the payees side). In a specific example, a payer requesting a full refund via the dispute resolution sidechain/channel may create and sign a transaction involving the sidechain/channel public address that transfers all of the associated tokens to a sidechain/channel public address that was previously issued to and is only controlled by the payer. In response, the payee may counter with a suggestion for a partial refund via the dispute resolution sidechain/channel by creating and signing a transaction involving the sidechain/channel public address that transfers a portion of the associated tokens to the sidechain/channel public address that was previously issued to and is only controlled by the payer. One of skill in the art in possession of the present disclosure will recognize that a payee may initialize a dispute resolution process by creating and signing a transaction involving the sidechain/channel public address that transfers a portion of the associated tokens to the sidechain/channel public address that is only controlled by the payer, and the payer may respond similarly as discussed above (e.g., creating and signing a transaction involving the sidechain/channel public address that adjusts the token amount to indicate a request for a larger refund) while remaining within the scope of the present disclosure.

At decision block 114, it may be determined whether the payer and the payee have agreed to a resolution to the dispute by signing the same or similar transactions that agree on a distribution of the transaction amount of the cryptocurrency that was sent by the payer at block 102. For example, if transaction(s) involving the sidechain/channel public address both include metadata that indicate the same distribution of the transaction amount of the cryptocurrency that was sent by the payer at block 102, the method 100 may proceed to block 116, discussed below. Similarly, if the transaction(s) involving the side chain public address both transfer tokens associated with the sidechain/channel public address in the same distribution, the method 100 may proceed to block 116, discussed below. In a specific example, a payer may provide a dispute communication that requests a full refund of the transaction amount of the cryptocurrency, and if the payee agrees (e.g., it is determined that the product was not delivered), the payee may sign that transaction (or a transaction that confirms that transaction by requesting the same transfer). In a specific example, a payee may provide a dispute communication that counters a request for a full refund of the transaction amount of the cryptocurrency with a transaction that includes an offer of a partial refund, and if the payer agrees (e.g., it is determined that the product was delivered, but was late or in a less than ideal condition), the payee may sign that transaction (or a transaction that confirms that transaction by requesting the same transfer). While a few examples of a payer and a payee agreeing to a distribution of the transaction amount of the cryptocurrency has been provided, one of skill in the art in possession of the present disclosure will recognize that payers and payees may negotiate a variety of solutions to disputes in a variety of manners that will fall within the scope of the present disclosure.

If, at decision block 114, it is determined that transaction(s) involving the sidechain/channel public address has been signed by the payer and the payee, the method 100 proceeds to block 116 where portions of the transaction amount of the cryptocurrency are sent from the primary cryptocurrency public address that received the transaction amount at block 102 to the cryptocurrency public addresses controlled by the payer and the payee according to the distribution identified in the signed transactions. In an embodiment, at block 116 and in response to the determining that the payer and payee have signed transaction(s) that involve the sidechain/channel public address and that indicate a resolution to the dispute, transaction(s) may be signed with a private key associated with the cryptocurrency blockchain public address that received the transaction amount of the cryptocurrency at block 102, and those transaction(s) may cause the transaction amount of the cryptocurrency to be transferred to cryptocurrency public address(es) controlled by the payer (e.g., the cryptocurrency blockchain public address that is controlled by the payer and that was included in the transaction sent by the payer at block 102) and the payee (e.g., the cryptocurrency blockchain public address that is controlled by the payee and that was included in the transaction sent by the payer at block 102).

In one example, the cryptocurrency blockchain public address that received the transaction amount at block 102 is associated with a smart contract as discussed above, and the terms of that smart contract may, in response to the detecting the signed transaction(s) that involves the sidechain/channel public address and that indicate that the payer and the payee have agreed on a distribution of the transaction amount of the cryptocurrency, cause a transaction(s) involving the cryptocurrency blockchain public address that received the transaction amount at block 102 to be signed as discussed above so that that transaction amount may be distributed according to the agreed upon distribution on the dispute resolution sidechain/channel. In another example, the system provider device may, in response to the detecting the signed transaction(s) that involve the sidechain/channel public address and that indicate that the payer and the payee have agreed on a distribution of the transaction amount of the cryptocurrency, use a private key to sign transaction(s) involving the cryptocurrency blockchain public address that received the transaction amount at block 102 to cause the transaction amount to be distributed according to the agreed upon distribution.

While a few examples have been provided, one of skill in the art in possession of the present disclosure will recognize that the transaction amount of cryptocurrency may be distributed to the payer and/or the payee at block 116 in a variety of manners that will fall within the scope of the present disclosure. As such, at block 116, the payer and/or the payee may receive any agreed up distribution of the transaction amount of cryptocurrency based on the dispute resolution process discussed above. One of skill in the art in possession of the present disclosure will recognize that the dispute resolution process may be viewed by the system provider as substantially automated when the smart contracts above are used and the payer and payee agree on the distribution of the transaction amount of cryptocurrency during a dispute.

If, at decision block 114, it is determined that transactions involving the sidechain/channel public address have not been signed by the payer and the payee, the method 100 proceeds to block 118 where the system provider performs a dispute resolution process and signs one or more transactions. In an embodiment, at decision block 114, it may be determined that the transaction(s) signed by the payer and the payee indicate no resolution has been found for the dispute process initiated by the dispute communications received from the payer and/or the payee at block 110. For example, there may be no transactions from both the payer and the payee that involve the sidechain/channel public address and that agree on a distribution of the transaction amount of the cryptocurrency received at block 102, and following some time period (e.g., a time period defined by the smart contract associated with the cryptocurrency public address or the sidechain/channel public address), the method 100 may proceed to block 118.

At block 118, the system provider may perform a dispute resolution that determines a distribution of the transaction amount of the cryptocurrency that was received at block 102, and then sign transaction(s) involving the sidechain/channel public address. In some embodiments, the unresolved dispute process that includes the dispute communications submitted by the payer and the payee must be reviewed by the system provider in order to determine resolution to the dispute. As such, the system provider device may include algorithmic methods for reviewing dispute communications and determining a dispute resolution that allocates some distribution of the transaction amount of the cryptocurrency between the payer and the payee. Furthermore, in some embodiments, the system provider may require a manual review of the dispute communications to determining the dispute resolution that allocates some distribution of the transaction amount of the cryptocurrency between the payer and the payee. One of skill in the art in possession of the present disclosure will appreciate that a dispute resolution of a dispute between a payer and a payee may involve many rules and techniques that will fall within the scope of the present disclosure.

Following the determination of the dispute resolution, the system provider may sign transaction(s) according to the distribution determined for the transaction amount of the cryptocurrency such that it is distributed between the payer and the payee. For example, at block 118, the system provider may sign transaction(s) involving the sidechain/channel public address to provide for the distribution of the transaction amount of the cryptocurrency between the payer and the payee. In another example, at block 118, the system provider may sign transaction(s) involving the cryptocurrency public address to provide for the distribution of the transaction amount of the cryptocurrency between the payer and the payee. The method 100 may then proceed to block 116 where the transaction amount of cryptocurrency is sent from the primary cryptocurrency public address to the cryptocurrency public addresses controlled by the payer and/or the payee according to the signed transaction(s) in substantially the same manner as discussed above (but with the exception that they are based on transactions signed by the system provider). As such, at block 116, the payer and/or the payee may receive a distribution of the transaction amount of cryptocurrency based on the dispute resolution process conducted by the system provider.

Thus, systems and methods have been described that provide a sidechain/channel (e.g., a secondary dispute resolution blockchain) for performing dispute resolution for transaction occurring on a primary cryptocurrency blockchain (e.g., a blockchain upon which cryptocurrency exchange transaction are performed). Payers and/or payees that perform transactions using a cryptocurrency and that also desire access to a dispute resolution process in the event those transactions are not satisfactory may have the transaction amount of the cryptocurrency sent to a designated primary blockchain public address that causes the transaction amount of the cryptocurrency to be "locked" (e.g., not transferrable for some period of time) and for a sidechain/channel public address on the sidechain/channel to be allocated to the transaction. The payee may then attempt to satisfy their end of the transaction, and the sidechain/channel public address may be utilized for dispute resolution in the event the payer or the payee is not satisfied with the transaction. In the event the payer and payee are satisfied with the transaction, they may allow a time period to pass, or may sign a transaction involving the sidechain/channel public address with their private key, to cause the transaction amount of the cryptocurrency sent from the designated primary blockchain public address to a primary blockchain public address controlled by the payee, completing the transaction. In the event a dispute about the transaction arises, the sidechain/channel public address may be utilized to receive dispute communications and negotiate a dispute resolution, or have the system provider determine a dispute resolution if one between the payer and the payee cannot be reached. Following the determination of a dispute resolution, the transaction amount of the cryptocurrency may be distributed to the payee and/or the payer based on that dispute resolution.

Figure 6:
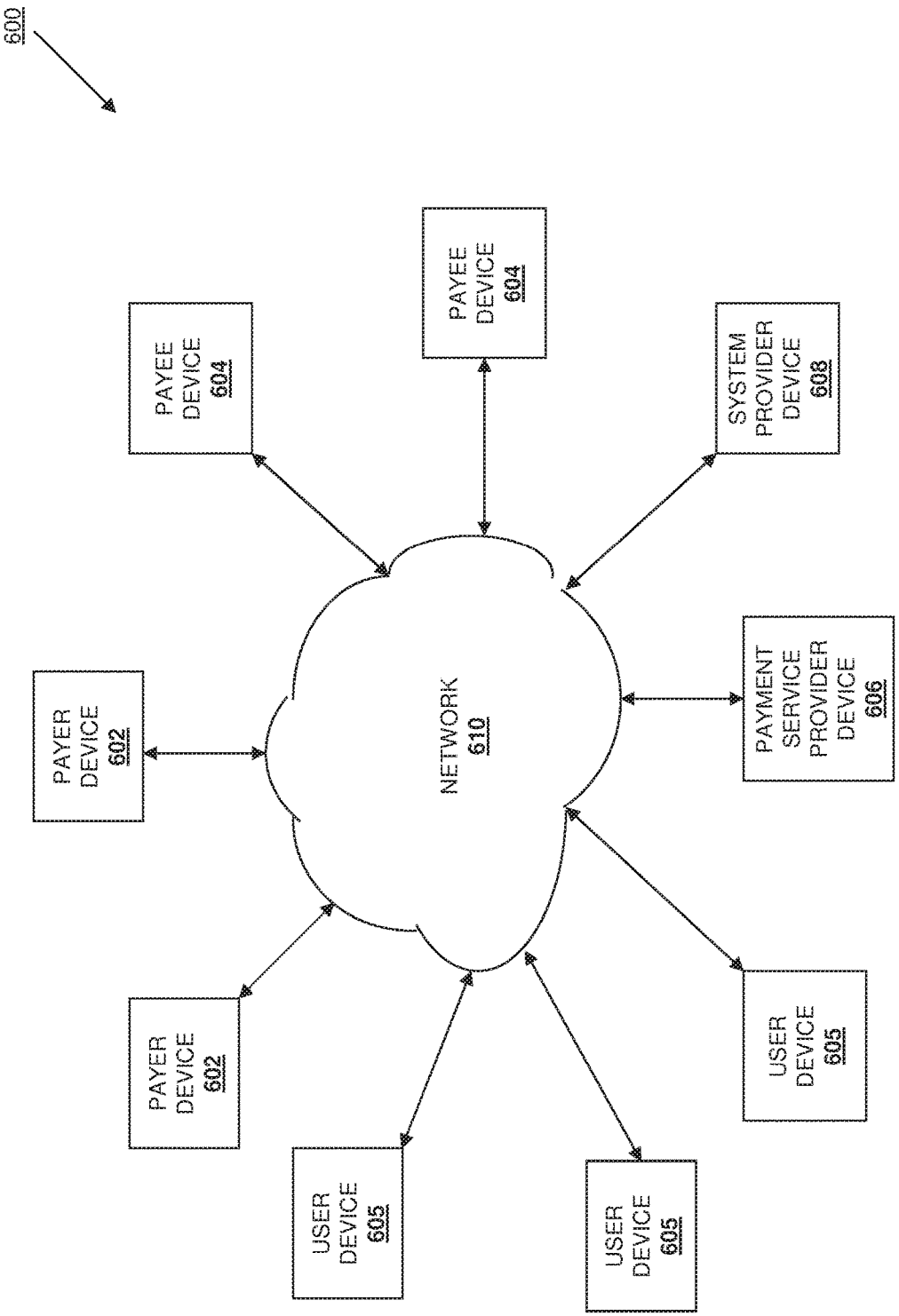
FIG. 6 is a schematic view illustrating an embodiment of a networked system.

Referring now to FIG. 6, an embodiment of a network-based system 600 for implementing one or more processes described herein is illustrated. As shown, network-based system 600 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 6 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 600 illustrated in FIG. 6 includes a plurality of payer devices 602, a plurality of payee devices 604, a plurality of user devices 605, a payment service provider device 606, and a system provider device 608 in communication over a network 610. Any of the payer devices 602 may be the payer devices operated by the payers discussed above. The payee devices 604 may be the payee devices operated by the payees discussed above. The user devices 605 may provide, for example, the distributed network of computing devices discussed above. The payment service provider device 606 may be the payment service provider devices discussed above and may be operated by a payment service provider such as, for example, PayPal Inc. of San Jose, Calif. The system provider device 608 may be operated by the system providers discussed above.

The payer devices 602, payee devices 604, user devices 605, payment service provider device 606, and system provider devices 608 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 600, and/or accessible over the network 610.

The network 610 may be implemented as a single network or a combination of multiple networks. For example, in various embodiments, the network 610 may include the Internet and/or one or more intranets, landline networks, wireless networks, and/or other appropriate types of networks.

The payer devices 602 may be implemented using any appropriate combination of hardware and/or software configured for wired and/or wireless communication over network 610. For example, in one embodiment, the payer devices 602 may be implemented as a personal computer of a user in communication with the Internet. In other embodiments, the payer devices 602 may be a smart phone, personal digital assistant (PDA), laptop computer, and/or other types of computing devices.

The payer devices 602 may include one or more browser applications which may be used, for example, to provide a convenient interface to permit the payer to browse information available over the network 610. For example, in one embodiment, the browser application may be implemented as a web browser configured to view information available over the Internet.

The payer devices 602 may also include one or more toolbar applications which may be used, for example, to provide user-side processing for performing desired tasks in response to operations selected by the payer. In one embodiment, the toolbar application may display a user interface in connection with the browser application.

The payer devices 602 may further include other applications as may be desired in particular embodiments to provide desired features to the payer devices 602. In particular, the other applications may include a payment application for payments assisted by a payment service provider through the payment service provider device 606. The other applications may also include security applications for implementing user-side security features, programmatic user applications for interfacing with appropriate application programming interfaces (APIs) over the network 610, or other types of applications. Email and/or text applications may also be included, which allow the payer to send and receive emails and/or text messages through the network 610. The payer devices 602 include one or more user and/or device identifiers which may be implemented, for example, as operating system registry entries, cookies associated with the browser application, identifiers associated with hardware of the payer devices 602, or other appropriate identifiers, such as a phone number. In one embodiment, the user identifier may be used by the payment service provider device 606 and/or system provider device 608 to associate the payer with a particular account as further described herein.

The payee devices 604 may be maintained, for example, by conventional or on-line merchants, conventional or digital goods sellers, individual sellers, and/or application developers offering various products and/or services in exchange for payment to be received conventionally or over the network 610. In this regard, the payee devices 604 may include a database identifying available products and/or services (e.g., collectively referred to as items) which may be made available for viewing and purchase by the payer.

The payee devices 604 also include checkout application which may be configured to facilitate the purchase by the payer of items. The checkout application may be configured to accept payment information from the user through the payer devices 602, the system provider through the system provider device 608, and/or from the payment service provider through the payment service provider device 606 over the network 610.

Figure 7:
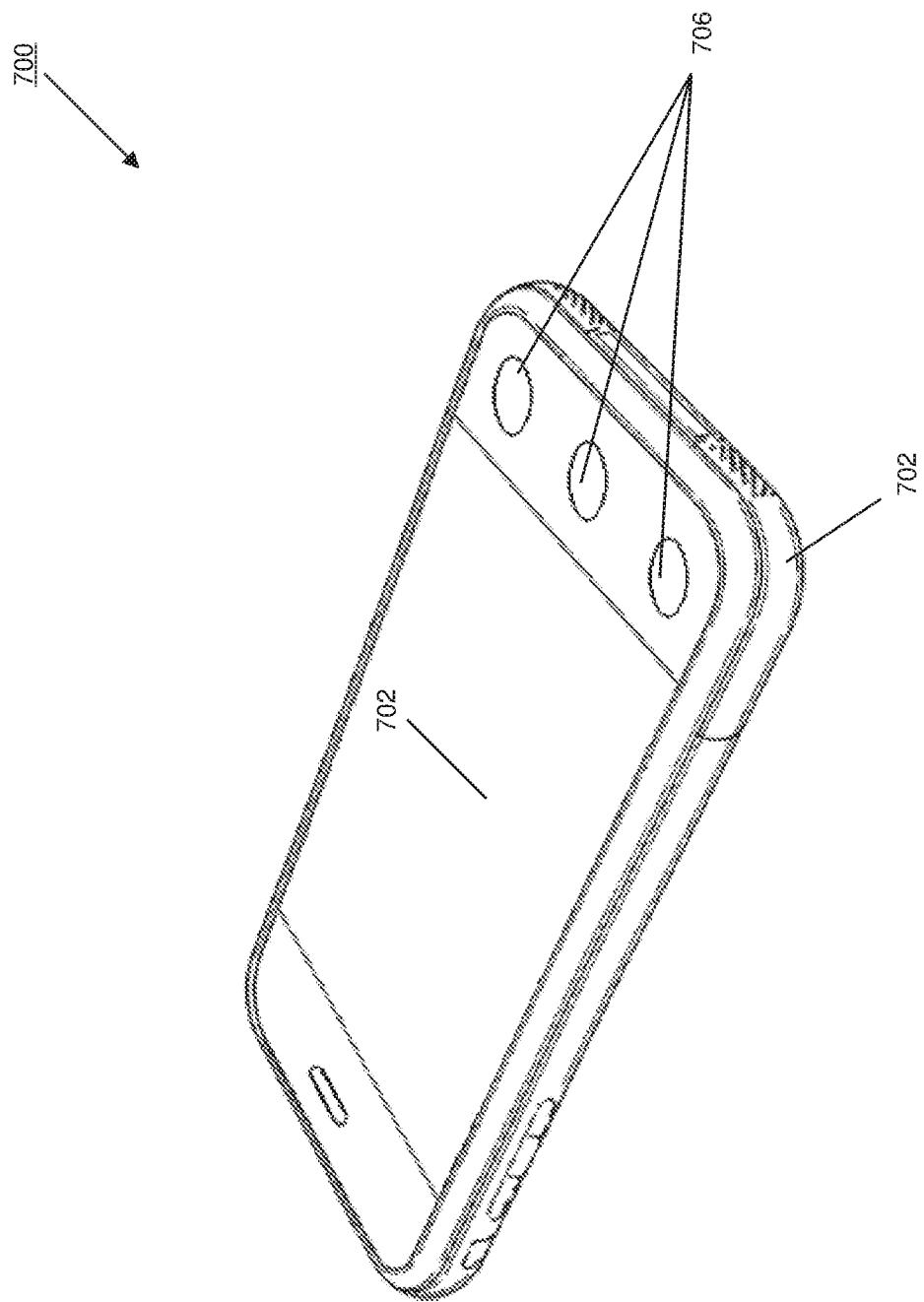
FIG. 7 is a perspective view illustrating an embodiment of a payer device.

Referring now to FIG. 7, an embodiment of a payer device 700 is illustrated. The payer device 700 may be the payer devices discussed above, and may include a chassis 702 having a display 704 and an input device including the display 704 and a plurality of input buttons 706. One of skill in the art will recognize that the payer device 700 is a portable or mobile phone including a touch screen input device and a plurality of input buttons that allow the functionality discussed above with reference to the method 100. However, a variety of other portable/mobile payer devices and/or desktop payer devices may be used in the method 100 without departing from the scope of the present disclosure.

Figure 8:
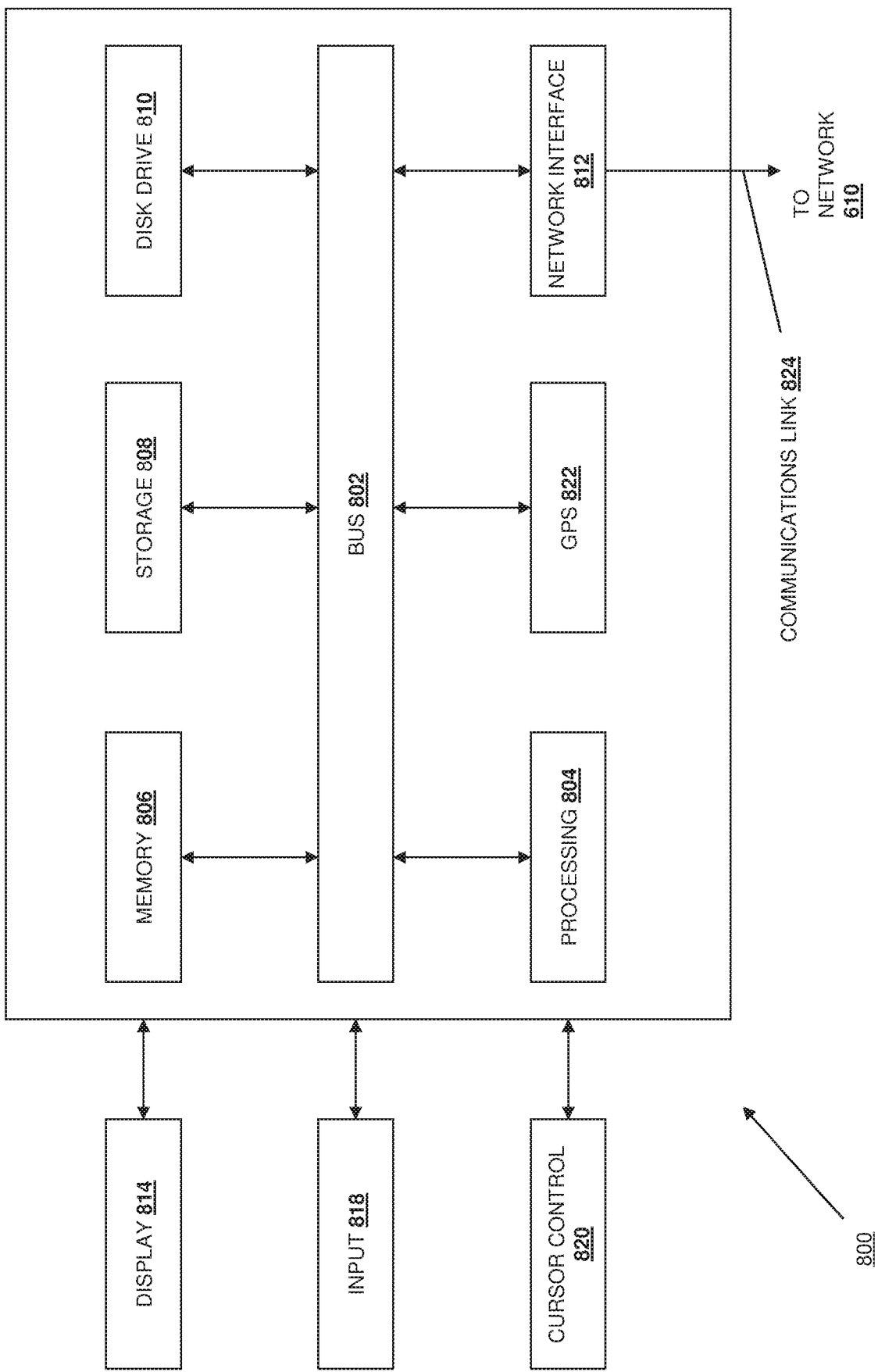
FIG. 8 is a schematic view illustrating an embodiment of a computer system.

Referring now to FIG. 8, an embodiment of a computer system 800 suitable for implementing, for example, the payer devices, the payee devices, the user devices, the payment service provider device, and/or the system provider device discussed above, is illustrated. It should be appreciated that other devices utilized by payer, payees, users, payment service providers, and system providers in the payment system discussed above may be implemented as the computer system 800 in a manner as follows.

In accordance with various embodiments of the present disclosure, computer system 800, such as a computer and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a location determination component 822 (e.g., a Global Positioning System (GPS) device as illustrated, a cell tower triangulation device, and/or a variety of other location determination devices known in the art.) In one implementation, the disk drive component 810 may comprise a database having one or more disk drive components.

In accordance with embodiments of the present disclosure, the computer system 800 performs specific operations by the processor 804 executing one or more sequences of instructions contained in the memory component 806, such as described herein with respect to the payer devices, the payee devices, the user devices, the payment service provider device, and/or the system provider devices discussed above. Such instructions may be read into the system memory component 806 from another computer readable medium, such as the static storage component 808 or the disk drive component 810. In other embodiments, hardwired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 800. In various other embodiments of the present disclosure, a plurality of the computer systems 800 coupled by a communication link 824 to the network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Figure 9:
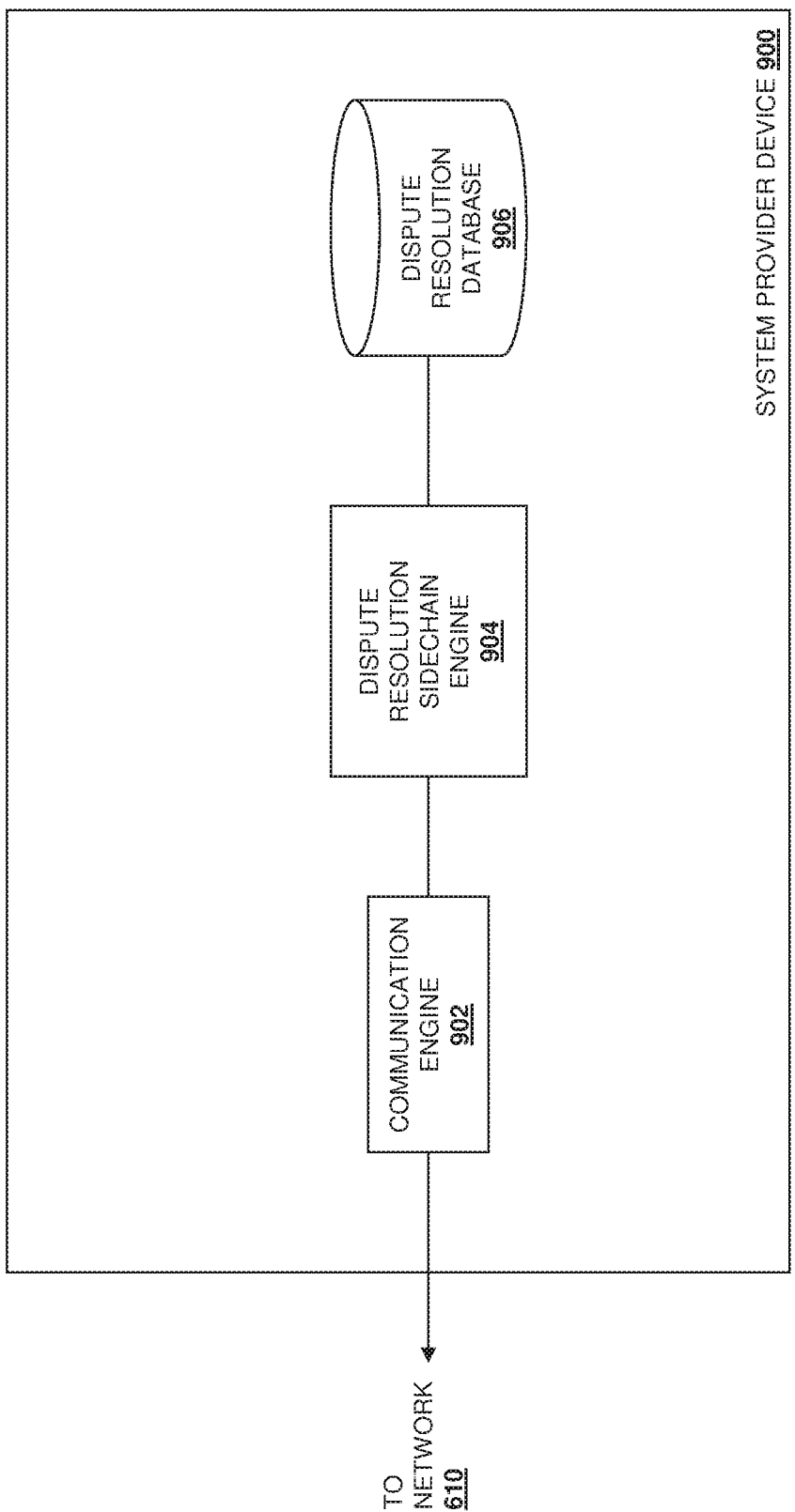
FIG. 9 is a schematic view illustrating an embodiment of a system provider device.

Referring now to FIG. 9, an embodiment of a system provider device 900 is illustrated. The device 900 includes a communication engine 902 that is coupled to the network 610 and to a dispute resolution sidechain engine 904 that is coupled to a dispute resolution database 906. The communication engine 902 may be software or instructions stored on a computer-readable medium that allows the device 900 to send and receive information over the network 610. The dispute resolution sidechain engine 904 may be software or instructions stored on a computer-readable medium that, when executed by one or more hardware processors, cause the device to perform any of the functionality that is discussed above. While the database 906 has been illustrated as located in the device 900, one of skill in the art will recognize that it may be connected to the dispute resolution sidechain engine 904 through the network 610 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
one or more processors; and
a non-transitory computer-readable medium having stored thereon instructions that are executable by the one or more processors to cause the system to perform operations comprising:
detecting that a transaction amount for a transaction has been received at a receiver public ledger address on a public ledger from a sender public ledger address;
automatically allocating, in response to the detecting, a sidechain dispute address on a dispute resolution sidechain ledger that corresponds to the receiver public ledger address;
transmitting the sidechain dispute address through a network to a sender device and a receiver device, the sender device associated with a sender involved in the transaction and the receiver device associated with a recipient involved in the transaction;
monitoring the sidechain address for dispute communications for a specified period of time;
detecting a first dispute communication that is received at the sidechain address and that is signed using a private key that identifies the sender; and
causing, based at least in part on detecting the first dispute communication, at least a portion of the transaction amount that was received at the receiver public ledger address to be sent back to the sender public ledger address.

2. The system of claim 1, wherein the operations further comprise:
detecting a second dispute communication that is received at the sidechain dispute address and that is signed using a private key that identifies the recipient; and
wherein causing the at least a portion of the transaction amount to be sent back to the sender public ledger address is based on content of the second dispute communication.

3. The system of claim 2, wherein the first dispute communication includes a return request from the sender for a return of the at least a portion of the transaction amount, and includes content specifying a reason for making the return request.

4. The system of claim 2, wherein the second dispute communication includes a reply request, signed using the private key that identifies the recipient, agreeing to return the at least a portion of the transaction amount.

5. The system of claim 1, wherein the operations further comprise:
recording the first dispute communication at the sidechain dispute address, wherein the first dispute communication is configured to be read by at least the recipient and the sender.

6. The system of claim 5, wherein the first dispute communication is encrypted such that it can only be decrypted and read by the receiver using the private key that identifies the recipient, or by the sender using the private key that identifies the sender.

7. The system of claim 1, wherein the operations further comprise:
determining that a specified period of time has elapsed since detecting the first dispute communication appeared at the sidechain dispute address; and
based on the specified period of time elapsing, broadcasting the first dispute communication to one or more additional parties other than the sender and the recipient.

8. A method, comprising:
- detecting, by a computer system, that a transaction amount for a transaction has been received at a receiver public ledger address on a public ledger from a sender public ledger address;
- automatically allocating, by the computer system in response to the detecting, a sidechain dispute address on a dispute resolution sidechain ledger that corresponds to the receiver public ledger address;
- transmitting the sidechain dispute address through a network to a sender device and a receiver device, the sender device associated with a sender involved in the transaction and the receiver device associated with a recipient involved in the transaction;
- monitoring the sidechain address for dispute communications for a specified period of time;
- detecting a first dispute communication that is received at the sidechain address and that is signed using a private key that identifies the sender; and
- causing, based at least in part on detecting the first dispute communication, at least a portion of the transaction amount that was received at the receiver public ledger address to be sent back to the sender public ledger address.

9. The method of claim 8, further comprising:
- detecting a second dispute communication that is received at the sidechain dispute address and that is signed using a private key that identifies the recipient; and
- wherein causing the at least a portion of the transaction amount to be sent back to the sender public ledger address is based on content of the second dispute communication.

10. The method of claim 9, wherein the first dispute communication includes a return request from the sender for a return of the at least a portion of the transaction amount, and includes content specifying a reason for making the return request.

11. The method of claim 9, wherein the second dispute communication includes a reply request, signed using the private key that identifies the recipient, agreeing to return the at least a portion of the transaction amount.

12. The method of claim 8, wherein the operations further comprise:
- recording the first dispute communication at the sidechain dispute address, wherein the first dispute communication is configured to be read by at least the recipient and the sender.

13. The method of claim 12, wherein the first dispute communication is encrypted such that it can only be decrypted and read by the receiver using the private key that identifies the recipient, or by the sender using the private key that identifies the sender.

14. The method of claim 8, further comprising:
- determining that a specified period of time has elapsed since detecting the first dispute communication appeared at the sidechain dispute address; and
- based on the specified period of time elapsing, broadcasting the first dispute communication to one or more additional parties other than the sender and the recipient.

15. The method of claim 8, further comprising:
- comparing a second dispute communication that is received at the sidechain address and that is signed using a private key that identifies the recipient to the first dispute communication; and
- wherein the causing at least a portion of the transaction amount to be sent back to the sender public ledger address is based on the comparing indicating a dispute resolution agreement between the sender and the recipient.

16. A non-transitory computer readable medium having instructions stored thereon that are executable by a computer system to cause the computer system to perform operations comprising:
- detecting that a transaction amount for a transaction has been received at a receiver public ledger address on a public ledger from a sender public ledger address;
- automatically allocating, in response to the detecting, a sidechain dispute address on a dispute resolution sidechain ledger that corresponds to the receiver public ledger address;
- transmitting the sidechain dispute address through a network to a sender device and a receiver device, the sender device associated with a sender involved in the transaction and the receiver device associated with a recipient involved in the transaction;
- monitoring the sidechain address for dispute communications for a specified period of time;
- detecting a first dispute communication that is received at the sidechain address and that is signed using a private key that identifies the sender; and
- causing, based at least in part on detecting the first dispute communication, at least a portion of the transaction amount that was received at the receiver public ledger address to be sent back to the sender public ledger address.

17. The non-transitory computer readable medium of claim 16, wherein the operations further comprise:
- detecting a second dispute communication that is received at the sidechain dispute address and that is signed using a private key that identifies the recipient; and
- wherein causing the at least a portion of the transaction amount to be sent back to the sender public ledger address is based on content of the second dispute communication.

18. The non-transitory computer readable medium of claim 17, wherein the first dispute communication includes a return request from the sender for a return of the at least a portion of the transaction amount, and includes content specifying a reason for making the return request.

19. The non-transitory computer readable medium of claim 17, wherein the second dispute communication includes a reply request, signed using the private key that identifies the recipient, agreeing to return the at least a portion of the transaction amount.

20. The non-transitory computer readable medium of claim 17, wherein the operations further comprise:
- recording the first dispute communication at the sidechain dispute address, wherein the first dispute communication is configured to be read by at least the recipient and the sender; and
- wherein the first dispute communication is encrypted such that it can be decrypted and read by the receiver using the private key that identifies the recipient, or by the sender using the private key that identifies the sender.

* * * * *